(No Model.)

F. W. GRAY.
HOSE SPANNER.

No. 336,915. Patented Mar. 2, 1886.

Witnesses
Fred L. Emery.
John F. C. Prinkert

Inventor.
Frederic W. Gray
by Crosby & Gregory
attys.

UNITED STATES PATENT OFFICE.

FREDERIC W. GRAY, OF LEOMINSTER, MASSACHUSETTS.

HOSE-SPANNER.

SPECIFICATION forming part of Letters Patent No. 336,915, dated March 2, 1886.

Application filed April 18, 1885. Serial No. 162,662. (No model.)

*To all whom it may concern:*

Be it known that I, FREDERIC W. GRAY, of Leominster, county of Worcester, State of Massachusetts, have invented an Improvement in Hose Spanners or Wrenches, of which the following description, in connection with the accompanying drawings, is a specification, like letters on the drawings representing like parts.

This invention has for its object to construct a hose-spanner which may be automatically operated to engage a hose coupling, and rotate the same to couple or uncouple the hose without disengagement of the spanner.

The invention consists in providing a hose spanner or wrench consisting of the usual hand-piece and connected semicircular arm, having an eye in line with the center line of the handle to engage one lug of the coupling with a spring-controlled engaging device, substantially as will be described, to automatically engage the opposite lug of the coupling, and remain in engagement therewith until positively released, as will be hereinafter set forth.

Figure 1:
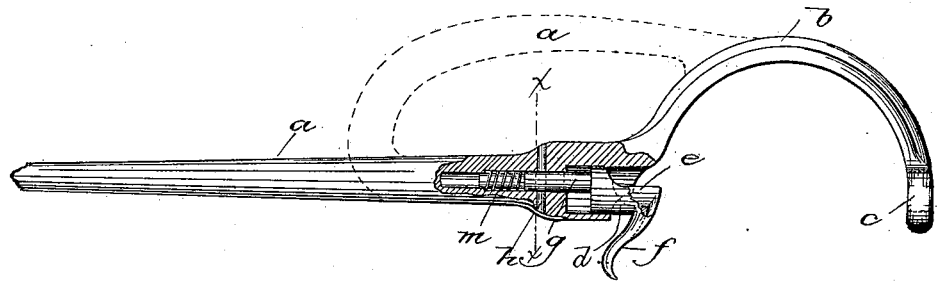
Figure 2:
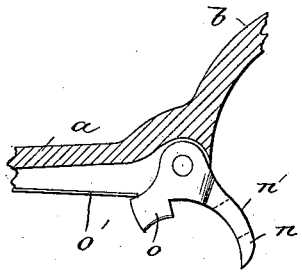

Figure 1 represents in elevation a hose-spanner or wrench embodying my invention, a portion being broken out to more fully show the engaging device; Fig. 2, a modified form of engaging device; and Fig. 3, a cross-section of Fig. 1, taken on the dotted line *x x*.

The hand-piece *a*, having the curved arm *b*, semicircular in shape, connected therewith, and provided with an eye, *c*, to engage one of the usual lugs or projections of a hose-coupling, are all as usual.

Figure 3:
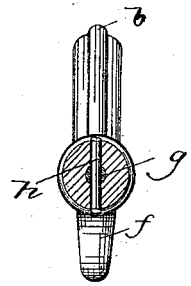

The hand-piece *a* is recessed or bored out to receive the engaging device, which, as shown in Figs. 1 and 3, consists of a sliding bolt, *d*, cut away at its inner face, as at *e*, to conform to the shape of the lug on the hose-coupling.

The engaging device is provided at its face with an inclined lip or projection, *f*, which facilitates the passage of the lug into the recessed portion *e*, back of the slide-bolt *d*, the said engaging device being slid or moved by contact with the lug to be engaged by it as the spanner is being applied to the coupling, the engaging device moved by the lug engaging and holding the latter until released by moving the engaging device by hand. The projection *f* is suitably extended to form a finger-piece, by means of which the said engaging device may be positively moved to free it from the lug of the coupling.

The engaging device, Figs. 1 and 3, has also connected with it a stem, *g*, fitted to the interior of the hand-piece *a*, said stem *g* being provided with a slot which receives a pin, *h*, thus preventing rotation and withdrawal of the engaging device.

The engaging device is normally held in position to engage the lug of the coupling by means of a spiral spring, *m*, seated within the hand-piece *a* and bearing against the stem *g*.

Fig. 1 shows the engaging device moved backward to release the coupling. To engage the coupling the spanner *b* is placed upon the coupling, the eye *c* engaging one lug, and the inclined lip or projection *f* of the engaging device is pressed against the opposite lug, thus forcing the engaging device backward until the lug passes over the said lip or projection, when the normal action of the spring *m*, previously compressed, will force the engaging device forward and lock the spanner to the coupling. After the coupling has been engaged by the spanner it may be rotated, as desired, without disengagement of the spanner from the coupling.

As shown in dotted line, Fig. 1, the hand-piece *a* may be turned over and attached to the curved arm or spanner *b*, such form of apparatus being especially applicable as a hose-carrier, as well as spanner or wrench.

Fig. 2 shows a modified form of engaging device, the lip or projection *n* being of sufficient size to contain an eye, *n'*, adapted to engage one lug of the coupling, said lip or projection being pivoted to the under side of the hand-piece *a*, which is cut away for such purpose. This pivoted projection is provided with a thumb-piece, *o*, against which bears a flat spring, *o'*, attached to the hand-piece.

The operation of both the devices is substantially the same.

I claim—

1. In a hose spanner or wrench, the hand-piece *a*, semicircular arm *b*, having an eye, *c*, to engage one lug of a coupling, substantially in line with the central line of the hand-piece, combined with a spring-controlled engaging device connected with the hand-piece at the junction of the semicircular arm and hand-piece, and provided with an inclined lip or face, which facilitates the passage of the opposing lug to automatically engage the same, substantially as described.

2. In a hose-spanner, the hand-piece provided with the semicircular arm, having an eye, c, and an engaging device, comprising a spring-controlled sliding bolt having a lip or projection, f, and stem g, slotted to receive the pin h, all operating substantially as described.

In testimony whereof I have signed my name to this specification in the presence of two subscribing witnesses.

FREDERIC W. GRAY.

Witnesses:
CEPHAS DERBY,
A. L. BURDETT.